United States Patent
Nelson

[15] 3,673,496
[45] June 27, 1972

[54] MOTION DETECTING CIRCUIT

[72] Inventor: Raymond L. Nelson, Rochester, N.Y.
[73] Assignee: Eastman Kodak Company, Rochester, N.Y.
[22] Filed: March 19, 1970
[21] Appl. No.: 21,113

[52] U.S. Cl. ............................ 324/161, 317/19, 340/263, 324/174
[51] Int. Cl. .................................................. G01p 3/56
[58] Field of Search .............. 324/161, 162, 166, 168, 171, 324/173, 174, 175, 78 J, 78 E, 78 Q; 317/5, 19; 340/263, 271

[56] References Cited

UNITED STATES PATENTS

| | | |
|---|---|---|
| 3,560,854 | 2/1971 | Moss ................................... 324/161 |
| 3,500,307 | 3/1970 | Lide ..................................... 340/271 |

*Primary Examiner*—Michael J. Lynch
*Attorney*—Robert W. Hampton and G. Herman Childress

[57] ABSTRACT

A circuit for detecting rotary motion of a shaft (or detecting that the shaft has stopped) includes a tachometer driven by the shaft. The tachometer output is amplified and converted by a transistor circuit so that the resulting signal can be used to operate a relay even when the shaft rotational speed is low. The relay operates suitable indicating or controlling means.

2 Claims, 1 Drawing Figure

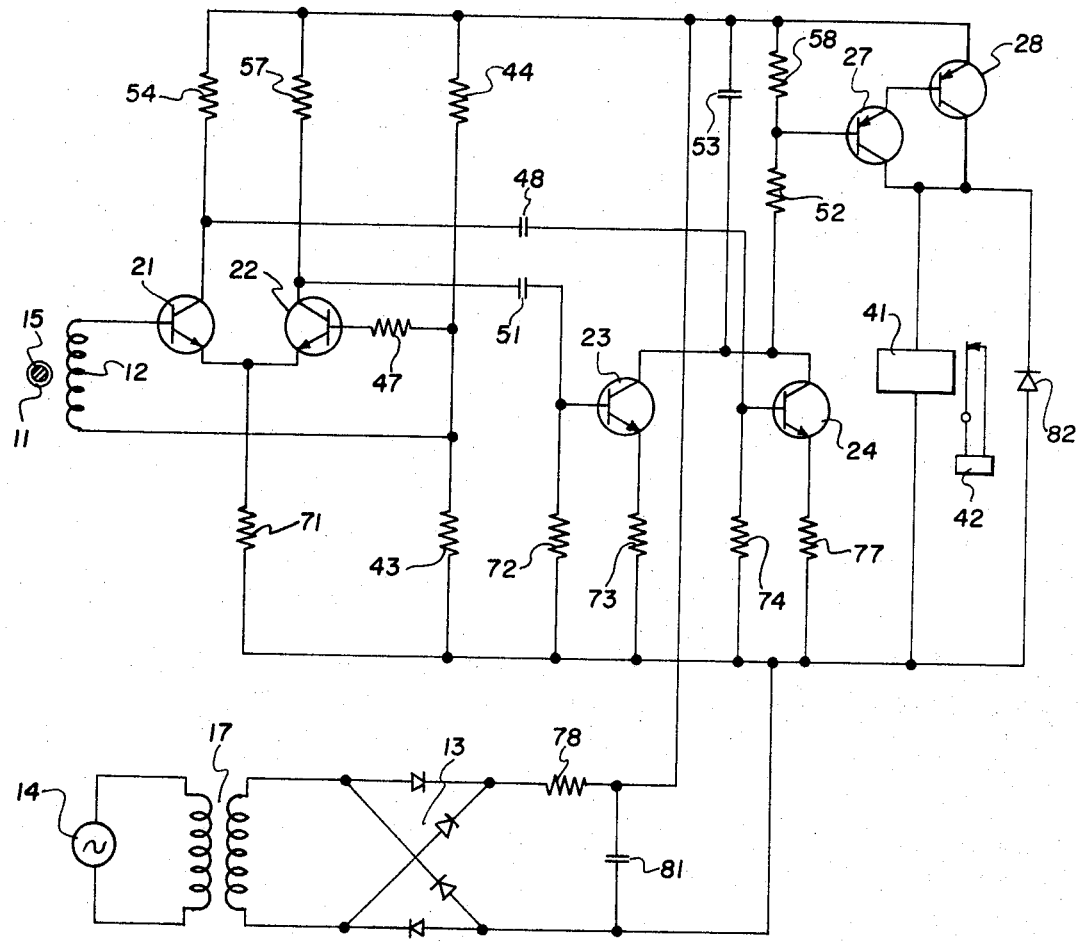

MOTION DETECTING CIRCUIT

BACKGROUND OF THE INVENTION

1. Field of the Invention

This invention relates to a circuit for detecting rotation of a shaft.

2. Description of the Prior Art

There are many occasions when it is important to quickly detect conditions which cause a desired motion to cease. The motion referred to is usually the rotation of a shaft, and many different devices have been proposed in the past for detecting the rotation of a shaft or, conversely, detecting the fact that the rotation has stopped. These prior devices have commonly utilized a tachometer coupled to the shaft in question, one device of this general nature being disclosed, for example, in U.S. Pat. No. 3,072,897 issued Jan. 8, 1963, to K. L. Fisher, et al. As pointed out in that patent, it is difficult to obtain useful indications from a tachometer in the instance of relatively low shaft speeds. However, in many important situations where it is desirable to detect motion, or lack of motion, the rotation rate of the involved shaft is quite low.

SUMMARY OF THE INVENTION

Accordingly, it is an object of my invention to improve the performance of motion detecting circuits.

A more specific object of the invention is to obtain tachometer initiated signals of adequate quality for indicating purposes even when the shaft rotation speed is relatively low.

In accordance with a specific illustrative embodiment of my invention, a tachometer is provided which comprises a permanent magnet coupled to a shaft and surrounded by a coil. As the shaft rotates a voltage is generated in the coil, the amplitude and frequency of which are approximately proportional to the speed of rotation of the shaft. This voltage is amplified and converted by transistor circuitry, and the resulting signal is utilized for operation of a relay. The relay operates suitable indicating or controlling means.

A feature of my invention is transistor circuitry effective to render a tachometer signal of low intensity effective to operate a relay.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which the single FIGURE shows schematically a motion detecting circuit as contemplated by a specific illustrative embodiment of the invention.

DESCRIPTION OF THE PREFERRED EMBODIMENT

Referring now to the drawing, the circuit shown may be used under circumstances where it is important that indication be given, or some action be performed, immediately upon a shaft starting to rotate or, in other circumstances, immediately upon the shaft ceasing to rotate. One such use is in a film processing mechanism wherein it is important to detect a condition which causes a shaft to cease rotation.

A tachometer includes a permanent magnet 11 which is coupled to a rotAtable shaft 15 and which is surrounded by coil 12. When the shaft rotates an a.c. voltage is generated in the coil, the amplitude and frequency of which are approximately proportional to the speed of rotation of the shaft.

A suitable d.c. potential is connected across the motion detecting circuit, such being supplied through a rectifier bridge 13. A suitable a.c. source 14 is connected to the rectifier bridge through a transformer 17.

Transistors 21 and 22 comprise a differential amplifier; transistors 23 and 24 act as detector amplifiers sharing a common load; while transistors 27 and 28 serve as drivers for relay 41.

Relay 41, when operated as subsequently described, may perform any desired indication or control function. In the illustrative embodiment, the relay is shown provided with a normally closed contact which closes a path to device 42 which may, for example, be a visual or audible alarm device which it is desirable to have actuated when the shaft is stopped and relay 41 is in normal, or non-operated, position.

Returning now to description of the overall circuit, a constant bias voltage is applied to the base of transistor 22 through resistors 43, 44 and 47. The tachometer signal is applied from coil 12 across the base of transistor 22 and the base of transistor 21. When the shaft rotates, therefore, transistors 21 and 22 produce equal magnitude signals which are 180° out of phase with each other and which are proportional to the rotational speed of the shaft.

The collector of transistor 21 is capacitively coupled to the base of transistor 24 via capacitor 48 and the collector of transistor 22 is capacitively coupled to the base of transistor 23 via capacitor 51. As stated hereinbefore, transistors 23 and 24 act as detector amplifiers with a common load. As the input to either of these transistors goes positive, the transistor is turned ON thereby reducing the voltage at the respective collector; since the inputs to transistors 23 and 24 are 180° out of phase, transistor 23 is switched ON when transistor 24 is switched OFF, and vice versa.

As is apparent from the above, the voltage across the common collector resistor 52 for the transistors 23 and 24 is driven in the negative direction twice during each complete rotation of the shaft. This is frequent enough that, with the filtering action provided by capacitor 53, a d.c. signal is produced which is adequate to switch relay driving transistors 27 and 28 to their ON condition. When transistor 28 is ON, a path is closed for operating relay 41 from the + side of the circuit, emitter-collector path of transistor 28, winding of relay 41 to the − side of the circuit.

When relay 41 operates, the activating path for indicator and/or alarm device 42 is opened and the device is deactivated; it will be obvious, of course, that operation of relay 41 may be made effective to close the activating path for alarm 42 if this is desirable in view of the particular conditions under which the circuit is being used.

Transistors 27 and 28 are so biased that they remain switched OFF in the absence of signals from transistors 23 and 24. Correspondingly, of course, relay 41 remains non-operated during such periods from which it follows that relay 41 by its operation or non-operation gives direct indication of the rotation or non-rotation of the shaft. A circuit path controlled by the relay contacts can be utilized in any particular manner to provide an alarm or to control an operation dependent upon either shaft rotation or stoppage of such rotation as desired.

The novel circuit arrangement whereby the tachometer signal is amplified and converted is such that, with circuit components of suitably selected characteristics a very low shaft rotational speed, for example of the order of 20 RPM, has proven adequate to operate the relay. Thus, the circuit of this invention is feasible for applications where only a relatively low shaft rotational speed is involved.

It will be understood that the circuit components included, but not separately referred to above, perform their normal well-understood functions in the overall circuit performance, this includes, for example, resistors 54, 57, 58, 71, 72, 73, 74, 77 and 78, capacitor 81 and diode rectifier 82.

The invention has been described in detail with particular reference to a preferred embodiment thereof, but it will be understood that variations and modifications can be effected within the spirit and scope of the invention.

I claim:

1. Apparatus for detecting rotary motion of a shaft, said apparatus comprising:
   a. a voltage source having first and second output terminals;
   b. means responsive to the rotation of a shaft for producing first and second signals during each complete rotation of the shaft, the first and second signals each having a first frequency related to the speed of rotation of the shaft, the first and second signals having respective waveforms 180° out of phase and mutually complementary with respect to each other;

c. first and second transistors each having emitter, base and collector terminals, and means for connecting said collector and emitter terminals of said first and second transistors to said first and second output terminals, respectively, of said voltage source;

d. means for connecting the shaft rotation means and applying the first and second signals to the base terminals of said first and second transistors whereby said first and second transistors selectively produce third and fourth signals, respectively, at said collector terminals at each occurrence of the first and second complementary signals;

e. am amplifier circuit including third and fourth transistors each having emitter, base and collector terminals, common load resistor means for commonly connecting said collector terminals of said third and fourth transistors to said first output terminal of said voltage source, and means for connecting said emitter terminals of said third and fourth transistors to said second output terminal of said voltage source;

f. means for connecting the collector terminals of the first and second transistors to the base terminals of said third and fourth transistors, respectively, of said amplifier circuit, whereby said third and fourth transistors amplify and combine the third and fourth signals appearing at the base terminals of the third and fourth transistors to produce a switching signal at said common load resistor means;

g. indicating means connected to said second output terminal responsive to said voltage source for producing an indication that the shaft is rotating when said first output terminal is connected to said indicating means; and h. switching means connected to said common load resistor means, said first output terminal and said indicating means and responsive to the switching signal at said common load resistor means for connecting said indicating means to said first output terminal of said voltage source, whereby said indicating means is rendered operable to produce an indication, in response to the switching signal, that the shaft is rotating.

2. The apparatus of claim 1 wherein sad switching means comprises:

fifth and sixth transistors having emitter; base and collector terminals;

means for connecting the base and collector terminals of the sixth transistor to the emitter and collector terminals respectively, of the fifth transistor and for connecting the emitter terminal of the sixth transistor to the first output terminal of the voltage source;

means for connecting said collector terminals of said fifth and sixth transistors to said indicating means; and means for applying the switching signal to the base terminal of the fifth transistor, whereby the fifth and sixth transistors are rendered conductive by the switching signal to connect voltage from the first output terminal of the voltage source to the indicating device to render the indicating device operative to produce an indication that the shaft is rotating.

* * * * *